June 26, 1934.　　　J. P. SPANG　　　1,964,092
MEAT SLITTING MACHINE
Filed Feb. 3, 1933　　　2 Sheets-Sheet 1
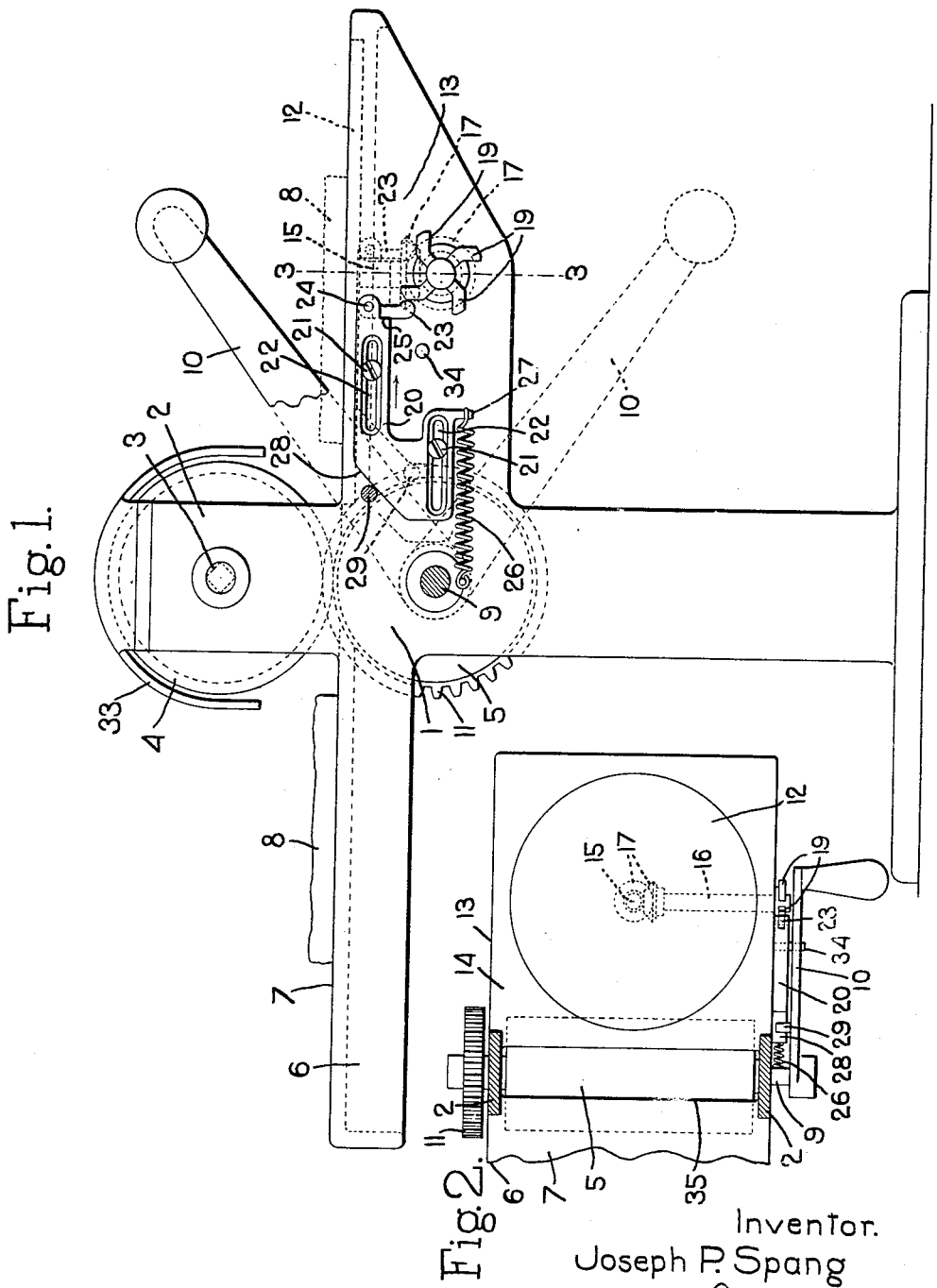
Inventor.
Joseph P. Spang
by Heard Smith & Tennant.
Attys.

June 26, 1934.  J. P. SPANG  1,964,092
MEAT SLITTING MACHINE
Filed Feb. 3, 1933   2 Sheets-Sheet 2

Inventor.
Joseph P. Spang
by Heard Smith & Tennant.
Attys.

Patented June 26, 1934

1,964,092

UNITED STATES PATENT OFFICE 1,964,092

MEAT-SLITTING MACHINE

Joseph P. Spang, Quincy, Mass.

Application February 3, 1933, Serial No. 655,024

8 Claims. (Cl. 17—26)

This invention relates to meat-slitting machines of that type which include a gang of rotary slitting knives and a feed roll co-operating with said knives to feed the slice of meat to be slit past the knives thereby to cut in the meat a series of parallel slits.

One of the objects of the invention is to provide a machine of this type with a turntable situated on the delivery side of the knives so that as the meat is fed past the knives and has had a series of parallel slits cut therein said meat will be delivered onto the turntable. The turntable provides means for giving the meat a quarter turn so that upon reversing the operation the meat may be fed back past the knives thereby to cut a second series of slits therein which are at right angles to the slits of the first series.

In order to give an understanding of the invention I have illustrated in the drawings some selected embodiments thereof which will now be described after which the novel features will be pointed out in the appended claims.

Fig. 1 is a side view of a machine embodying my invention;

Fig. 2 is a fragmentary view on a reduced scale showing the turntable;

Figure 3:
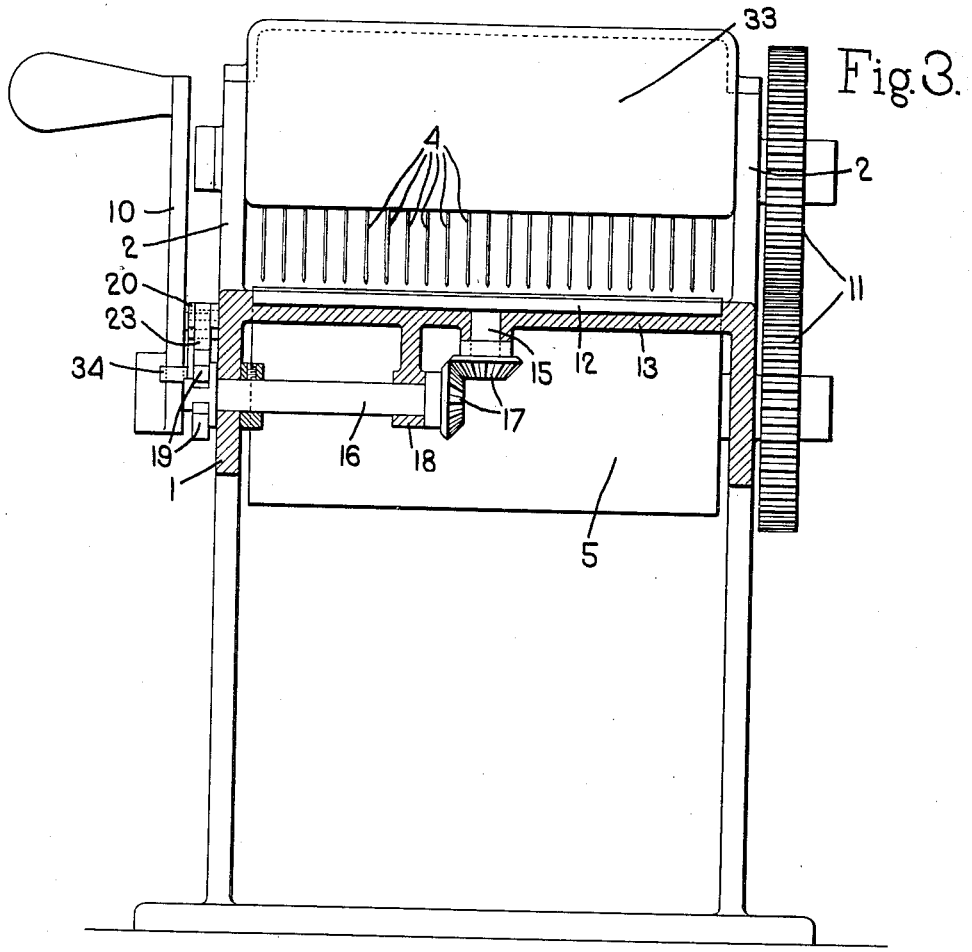
Fig. 3 is a section on the line 3—3, Fig. 1.

The apparatus herein shown comprises a suitable supporting frame 1 having an upstanding portion 2 at each side in which is mounted for rotation a knife-supporting shaft 3. This shaft 3 has fast thereon a plurality of rotary slitting knives 4 which are suitably spaced apart. Co-operating with the slitting knives 4 is a feed roll 5 herein shown as situated below the knives and spaced slightly from the periphery of the knives, said roll constituting means for feeding the meat to be slit past the knives.

The frame 1 is also shown as provided with an extension 6 forming a meat-receiving platform or table 7 on which may be placed the slice of meat 8 to be slit.

Suitable means are provided for rotating the feed roll 5 and the knives 4 and preferably such means will be so constructed that the surface speed of the knives will be greater than that of the feed roll 5, with the result that the knives will operate on the meat with a slicing cut.

As herein shown the roll is fast on a supporting shaft 9 which is journalled in the frame and this shaft has fast thereon a crank handle 10 by which the feed roll may be operated. The shaft 9 for the feed roll is geared to the knife shaft 3 through the medium of intermeshing gears 11.

The diameter of the feed roll is shown as somewhat less than that of the knives. The gears 11, however, are illustrated as of the same diameter so that the two shafts 9 and 3 will rotate at the same speed. Since the knives are larger in diameter than the roll 5 and since the meat will be fed forward at a speed no greater than the surface speed of the feed roll 5 it follows that the cutting edges of the knives will be travelling at a greater surface speed than that of the roll and said knives, therefore, will slit the meat with a slicing cut.

Figure 4:
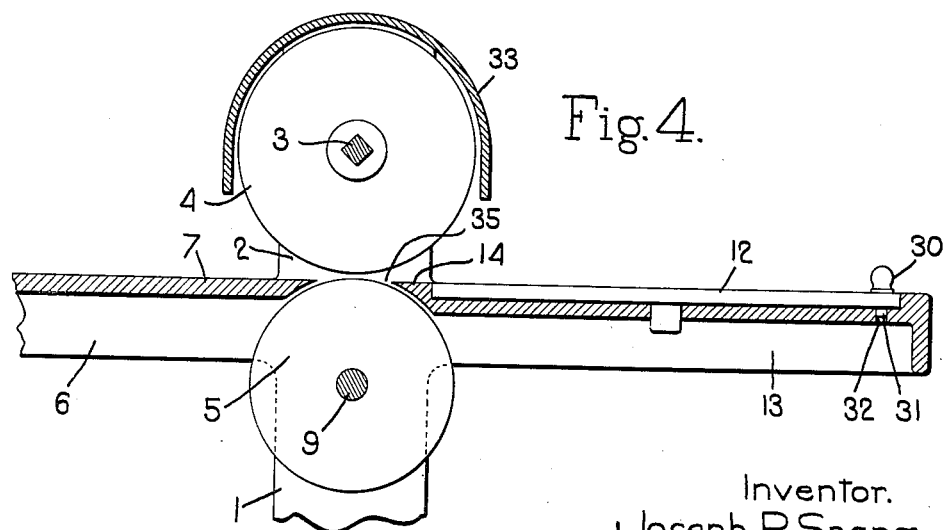
Fig. 4 is a fragmentary longitudinal section through a meat-slitting machine showing a different form of the invention.

Situated on the delivery side of the feed roll is a turntable 12 which is mounted to rotate about a fixed axis in an extension 13 of the frame. The upper surface 14 of this extension 13 is on the level with the receiving platform 7 as best seen in Fig. 4 but is spaced therefrom sufficiently to provide an opening 35 in which the upper surface of the feed roll 5 is received.

The turntable may be either manipulated manually or may be operated automatically. In Fig. 1 I have shown automatic means for giving the turntable quarter-rotations at each operation of the feed roll 5. The construction in Fig. 1 is such that a rotation of the crank handle 10 from the dotted to the full line position of Fig. 1 will give the feed roll 5 sufficient rotation to carry a slice of meat 8 through the machine and onto the turntable 12. A further clockwise rotative movement of the handle 10 from the full line position of Fig. 1 will operate to automatically turn the turntable through 90°. After this is done the handle may be given a reverse or counter-clockwise rotation and the slice of meat 8 may be then fed to the knives from the turntable side and such backward or counter-clockwise rotation of the feed roll will feed the meat back onto the receiving platform 7. During the forward movement of the slice of meat a series of parallel slits will be cut therein. When the meat is fed back through the machine by a counter-clockwise rotation of the handle 10 after the turntable has been given a quarter turn then a second series of slits will be cut in the meat which are at right angles to the first series of slits.

As shown in Figs. 1 and 3 the turntable 12 is provided with a spindle 15 which is journalled in the portion 13 of the frame and about which said turntable rotates. This spindle is geared to a horizontal shaft 16 through the medium of bevelled gears 17, said shaft being suitably journalled at one end in a bracket bearing 18 depending from the portion 13 of the frame and at the other end in the side of the frame 1. The shaft 16 is provided at its outer end with four fingers 19.

Slidably mounted on the frame 13 is an actuating slide 20, said slide having a to-and-fro movement in a horizontal direction and being guided in its movement by guiding screws 21 which are secured in the frame and which operate in slots 22 with which the slide is provided. This actuating slide 20 has a bunter 23 pivoted thereto at its outer end, said bunter being pivoted to the slide at 24 and being free to swing toward the right in Fig. 1 but being limited in its swinging movement to the left by a shoulder 25 with which the slide is provided.

The slide is normally held in its retracted position shown in dotted lines Fig. 1 by means of a pulling spring 26, one end of which is secured to the frame 1 and the other end of which is secured to a finger 27 depending from the slide 20. This slide is provided with a cam surface 28 and the handle 10 carries a projection or pin 29 adapted to engage the cam surface 28 just before the handle reaches the full line position Fig. 1.

If the handle 10 is given a further clockwise rotative movement to carry the pin 29 from the full to the dotted line position of Fig. 1 the engagement of the pin with the cam surface 28 will force the slide 20 to the right and carry the bunter into the dotted-line position. During such movement of the slide the bunter 23 will engage one of the fingers 19 and thereby rotate the shaft 16 and produce a turning movement in the turntable.

The fingers 19 and bunter 23 are so designed that at each forward movement of the slide the shaft 16 will be given a quarter rotation. This quarter rotation of the turntable, therefore, will always occur after the slice of meat 8 has been fed beyond and clear from the knives 4.

If necessary, the operator may assist the feeding movement of the meat past the knives and the delivery of the meat onto the turntable by using a fork or other implement or by grasping the edge of the slice of meat after it has emerged from the knives and applying a gentle pulling force to the slice. In any event, the operation of turning the turntable occurs after the meat has been deposited on said turntable. When the turntable has been turned the operator may then reverse the movement of the handle 10 and feed the meat back through the machine onto the platform 7, during which operation the knives will cut a second series of slits in the meat which are at right angles to those cut during the forward pass of the meat.

During the first part of the counter-clockwise movement of the handle 10 the pin 29 will free itself from the slide and the spring 26 will then operate automatically to restore the slide to the left hand dotted line position of Fig. 1. During this restoring movement the pivoted bunter 23 will click over one of the fingers 19 and will thus be positioned ready to give the turntable another quarter rotation upon the next clockwise operation of the handle 10.

Instead of the automatic means for actuating the turntable it is possible to manipulate the turntable manually. In Fig. 4 a construction is shown wherein the turntable 12 is provided with a handle 30 by which said turntable may be manually turned. In this embodiment it is intended that the turning movement of the turntable should be limited to a quarter rotation, for which purpose the turntable may have a stop finger 31 depending therefrom and operating in a quadrant groove 32 formed in the portion 13 of the frame.

33 indicates a guide for the knives 4 which extends from one upright 2 to the other and is supported thereby.

34 indicates a stop pin extending from the frame and which limits the clockwise movement of the handle 10.

I claim:

1. A machine for slitting meat comprising a gang of rotary knives, a feed roll for feeding meat to be slit past the knives, means to rotate both the feed roll and the knives, a turntable on the delivery side of the knives to receive the meat as it is delivered from the knives, said turntable being rotatable about a fixed axis and automatic means for giving the turntable a quarter rotation at each forward operation of the feed roll.

2. A machine for slitting meat comprising a gang of rotary knives, a feed roll for feeding meat to be slit past the knives, means to rotate both the feed roll and the knives, a turntable on the delivery side of the knives and rotatable about a fixed axis and adapted to receive the meat as it is delivered from the knives, and means actuated by the knife-rotating means to turn the turntable.

3. A machine for slitting meat comprising a gang of rotary knives, a feed roll associated therewith for feeding a slice of meat past said knives, actuating means for rotating both the feed roll and the knives, a turntable situated on the delivery side of said knives and rotatable about a fixed axis and adapted to receive the meat as it is delivered from the knives, and a turntable-rotating means operated by said actuating means.

4. A machine for slitting meat comprising a frame having a receiving platform and a delivery portion, a gang of rotary slitting knives journalled in the frame above the level of the receiving platform and delivery portion, a feed roll also journalled in the frame between the receiving platform and delivery portion, means to rotate the feed roll and the knives to cause a slice of meat to be fed past the knives from the receiving platform to the delivery portion and to be slit by the knives, a turntable mounted on the delivery portion for rotation about a fixed axis and situated to receive the meat as it is delivered from the knives, and means for rotating the turntable.

5. A machine for slitting meat comprising a gang of rotary knives, a feed roll associated therewith for feeding a slice of meat past said knives, means for giving both the feed roll and the knives a limited forward rotation, a turntable mounted on the delivery side of the knives and rotatable about a fixed axis and adapted to receive the meat as it is delivered from the knives, and means to rotate the turntable by the knife-rotating means during the final forward turning movement of the feed roll.

6. A machine for slitting meat comprising a frame having a receiving platform and a delivery portion, a gang of rotary slitting knives journalled in the frame, a feed roll situated between the receiving platform and the delivery portion, means to rotate the feed roll both forwardly to feed a slice of meat past the knives from the receiving platform to the delivery portion and backwardly to feed said slice of meat from the delivery portion back to the receiving platform, a turntable mounted on the delivery portion to rotate about a fixed axis and situated to receive the slit meat as it is fed past the knives, and means to rotate the turntable by the knife-rotating means during the forward rotation only of the feed roll.

7. A machine for slitting meat comprising a frame, a gang of rotary knives journalled therein, a feed roll also journaled in the frame and associated with the knives for feeding a slice of meat past the knives, a stop to limit the forward rotation of the feed roll, a turntable rotatable about a fixed axis and situated on the delivery side of the knives, and means actuated during the final portion of the rotation of the feed roll to give the turntable a quarter rotation.

8. A machine for slitting meat comprising a frame, a gang of rotary knives journalled therein, a feed roll also journalled in the frame and co-operating with the knives for feeding a slice of meat past the knives, means for rotating both the feed roll and the knives with the knives rotating at a greater surface speed than the feed roll, a turntable situated on the delivery side of the knives and rotatable about a fixed axis and adapted to receive the meat as it is delivered from the knives, and means actuated by the knife-rotating means to turn the turntable.

JOSEPH P. SPANG.